No. 747,451. PATENTED DEC. 22, 1903.
W. A. LORENZ.
CAN OR JAR.
APPLICATION FILED AUG. 5, 1902.
NO MODEL.

Witnesses:
H. Mallner
Joseph Merritt

Inventor
William A. Lorenz
By Wm H Houiss, Att'y.

THE NORRIS PETERS CO., PHOTO-LITHO., WASHINGTON, D. C.

No. 747,451.

Patented December 22, 1903.

UNITED STATES PATENT OFFICE.

WILLIAM A. LORENZ, OF HARTFORD, CONNECTICUT, ASSIGNOR OF THREE-FOURTHS TO WILLIAM H. HONISS, OF HARTFORD, CONNECTICUT, AND BEECH-NUT PACKING COMPANY, OF CANAJOHARIE, NEW YORK, A CORPORATION OF NEW YORK.

CAN OR JAR.

SPECIFICATION forming part of Letters Patent No. 747,451, dated December 22, 1903.

Application filed August 5, 1902. Serial No. 118,472. (No model.)

*To all whom it may concern:*

Be it known that I, WILLIAM A. LORENZ, a citizen of the United States, and a resident of Hartford, in the county of Hartford and State of Connecticut, have invented certain new and useful Improvements in Cans or Jars, of which the following is a full, clear, and exact specification.

This invention relates to improvements in hermetically-sealed cans and jars of the class employed for the exclusion of air from foods or other materials.

My preferred embodiment of this invention is shown in the first four figures of the drawings, in which similar characters denote similar parts.

Figure 1:
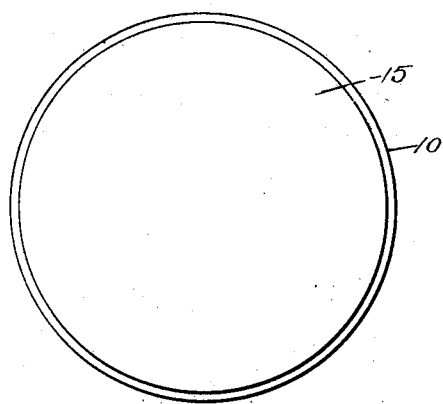
Figure 3:
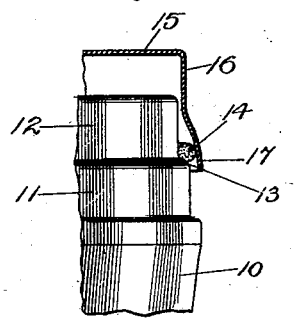
Figure 2:
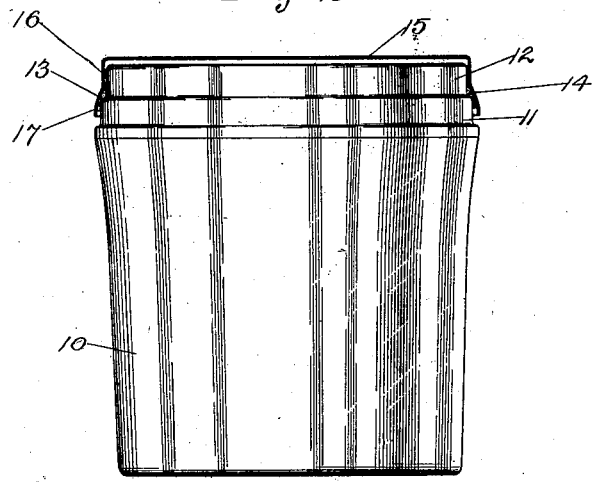
Figure 4:
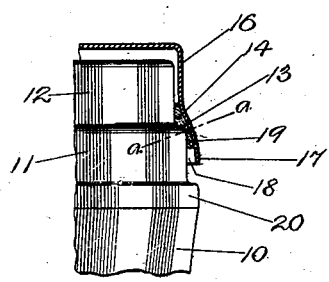
Figure 5:
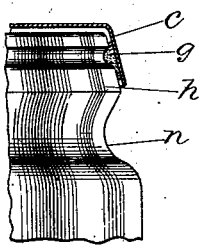

Figure 1 is a plan view. Fig. 2 is a side view, in which the cap and gasket are shown in section, taken through the middle of Fig. 1 in their closed or sealed position. Fig. 3 is an enlarged portion of the cap, jar, and gasket of Fig. 2, showing the parts preparatory to being sealed. Fig. 4 is a similar view showing the parts after sealing. Fig. 5 is a fragmentary view of a jar and cap of the prior art.

Jars of this class are, as shown in Fig. 5, commonly provided with a reduced neck $n$, surmounted by an upwardly-converging head $h$, provided with a groove for receiving the gasket $g$, which is flattened by a flexible metallic cap $c$, the rim of which is flared in substantial conformity with the upwardly-converging head of the jar. When the cap is forced down to seal such a jar, the middle of the gasket is compressed in the groove, and its edges are flattened out in the joint between the comparatively wide parallel zones of the rim and jar, presenting a wide annular surface for taking the pressure, which is therefore distributed over that surface. Inasmuch as the pressure upon any given surface is reduced in inverse ratio to the extent of the entire supporting area when the sealing-pressure is thus distributed over a comparatively wide annular surface, the chances of making a continuous air-excluding joint entirely around the jar are correspondingly reduced. In my present invention these objections are overcome by providing a comparatively narrow sealing zone, against which the gasket is compressed in the sealing operation, a free space being left above and below the sealing zone into which the rubber is readily forced whenever any inequalities exist in the thickness of the rubber gasket or in the contour of the sealing zone. I also provide a projecting shoulder immediately below the edge of the cap, which shoulder is as large as or larger than the diameter of the cap, and thus forms a protecting-surface for that edge entirely around its perimeter.

The upper or mouth portion of the jar 10 is formed with two cylindrical zones 11 and 12, the zone 11 being somewhat larger in diameter than the zone 12 to the extent of the intervening narrow circumferential shoulder 13, which forms the sealing-seat for the gasket, the shoulder being preferably rounded, as shown.

The gasket 14 is received upon the zone 12 of the jar just above the rounded shoulder 13, as shown in Fig. 3, prior to the sealing operation. The flexible metallic cap 15 is provided with a rim having a substantially cylindrical portion 16 and a flaring portion 17. The greater portion of the sealing pressure is borne by the rounded shoulder 13, thereby compressing the gasket around a comparatively narrow zone at line $a\ a$ much more than it is compressed elsewhere, inasmuch as the contour of the shoulder 13 diverges from that of the cap both above and below that zone. Below that shoulder the contours of the jar and cap diverge to form an opening 18, which is wider the farther it departs from the narrow zone at $a\ a$. Therefore the gasket 14 will not be compressed at 19 below the shoulder 13 as much as it will be compressed across the narrow zone $a\ a$. The free space above the sealing zone is comparatively limited by reason of the close fit of the cylindrical portion 16 of the cap against the zone 12 of the jar which practically confines the upper edge and displaced portion of the gasket to the interior corner at the bottom of the zone 12. Although the degree of compression of the gasket into that corner will depend upon the size of the gasket and the extent to which it is displaced from the shoulder 13, the pressure into the corner will always be less than the pressure at the narrow sealing zone *a a*, upon which reliance is placed for the effectiveness of the seal.

The jar 10 is provided with a projecting shoulder 20, which may extend as far as the outer diameter of the cap-rim 17 or beyond the peripheral edge of that cap far enough to protect the latter from being bent during transportation and handling.

In the operation of sealing the jar the air is exhausted from the interior, and the cap 15 is pressed down upon the gasket 14 and operates first to flatten out that gasket into a band which extends above and below the shoulder 13 and then to compress or pinch it against a narrow annular zone, (indicated by *a a*,) thereby making a tighter and more secure and reliable joint than if the pressure were distributed over a wider zone. Furthermore, the continued atmospheric pressure upon the cap, which pressure in jars of this class is now usually relied on to maintain the seal, will when thus concentrated upon a narrow zone more readily follow the gasket as it shrinks and hardens, and thus more surely maintain a tight seal than if that pressure were distributed over a wider zone.

In the operation of unsealing the cap 15 a tool may be inserted in the opening 18, and the rim 17 may be sprung away, forming a passage between the gasket and the cap for the readmission of air into the interior of the jar, after which the cap may be readily removed.

The contours of the jar and cap just above the shoulder leave only a small annular recess for the upper edge of the compressed gasket, and hence a smaller gasket may be employed than if the jar were provided with a groove for receiving the gasket.

In cans and jars of this class the cost of the gasket bears a very large proportion to the cost of the complete "package," which is the term applied to the combined jar, cap, and gasket. The gaskets for this class of cans and jars are usually made to a greater or less extent of a good quality of rubber, which is always expensive. Hence the importance in point of economy of reducing the size of the gasket, since the amount of the material, and consequently the cost thereof, are thereby correspondingly reduced. By thus concentrating the principal pressure upon a narrow circumferential zone at the middle of the width of the gasket better results are obtained than if the same pressure is applied at one or both edges of the gasket or is distributed over the entire surface of a gasket or upon a flat gasket-seat. This is particularly true in the case of glass jars, which as manufactured commercially are liable to be out of symmetry, causing more or less unevenness in the gasket-seat. A narrow sealing zone is more likely in such a case to adjust itself to the irregularities and to form a continuous and uniform seal.

When a small gasket is used, and particularly when it is used upon glass jars which are unsymmetrical or uneven, as above described, the perfection and integrity of the seal is increasingly dependent upon a correct centering of the cap with the jar prior to and during the sealing operation. The narrower the gasket the greater the liability of imperfect sealing due to the sidewise shifting of a loosely-fitting cap. Hence the zone 16 of the cap is made to fit the zone 12 of the jar as closely as is practical under the conditions of commercial manufacture.

The term "rounded," as herein applied to the shoulder 13, is intended to designate any such chamfering or beveling of the shoulder as will avoid the use of an extremely sharp corner on that shoulder.

I claim as my invention—

1. The combination, with a gasket and with a cap having an approximately cylindrical body and a flaring rim for sealing the gasket, of a jar provided with a cylindrical receiving-seat for the gasket, and provided with a rounded shoulder below the said receiving-seat for establishing a narrow zone of sealing pressure upon the gasket between the upper and lower edges thereof, the cylindrical receiving-seat approximately fitting the body of the cap for centralizing the cap and confining the upper edge of the gasket when sealed.

2. The combination, with a gasket and with a cap having an approximately cylindrical body and a flaring rim for sealing the gasket, of a jar provided with a cylindrical receiving-seat for the gasket, and provided with a rounded shoulder below the said receiving-seat for establishing a narrow zone of sealing pressure upon the gasket between the upper and lower edges thereof, the cylindrical receiving-seat approximately fitting the body of the cap for centralizing the cap and confining the upper edge of the gasket when sealed, and the contour of the jar below the rounded shoulder being cylindrical, with the flaring edge of the cap diverging therefrom.

In testimony whereof I have signed my name to this specification, in the presence of two subscribing witnesses, this 4th day of August, 1902.

WILLIAM A. LORENZ.

Witnesses:
JOSEPH MERRITT,
CAROLINE M. BRECKLE.